(12) United States Patent
Viswanathan et al.

(10) Patent No.: US 12,342,099 B2
(45) Date of Patent: Jun. 24, 2025

(54) SYSTEMS AND METHODS FOR DETECTING AND PREVENTING FRAUD IN A VIDEO CONFERENCING SYSTEM

(71) Applicant: Verizon Patent and Licensing Inc., Basking Ridge, NJ (US)

(72) Inventors: Harish Narayan Viswanathan, Bangalore (IN); Kandasamy Muniasamy, Pleasanton, CA (US); Anupam Shah, Bangalore (IN); Tarun Nagpal, Bengaluru (IN); Kunal Sachdeva, Kanpur (IN); Anirban Roy, West Bengal (IN); Dipanwita Ghosh, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 220 days.

(21) Appl. No.: 18/055,627

(22) Filed: Nov. 15, 2022

(65) Prior Publication Data

US 2024/0163396 A1 May 16, 2024

(51) Int. Cl.
| | |
|---|---|
| *H04N 7/15* | (2006.01) |
| *H04L 9/40* | (2022.01) |
| *H04L 12/18* | (2006.01) |

(52) U.S. Cl.
CPC ............ *H04N 7/15* (2013.01); *H04L 12/1818* (2013.01); *H04L 12/1822* (2013.01); *H04L 63/0236* (2013.01); *H04L 63/1416* (2013.01)

(58) Field of Classification Search
CPC ... H04N 7/15; H04L 12/1818; H04L 12/1822; H04L 63/0236; H04L 63/1416
USPC ........................................................ 348/14.08
See application file for complete search history.

(56) References Cited

U.S. PATENT DOCUMENTS

| | | | |
|---|---|---|---|
| 10,382,451 B2 * | 8/2019 | Bejarano Ardila | ......................... H04L 63/1441 |
| 12,088,609 B1 * | 9/2024 | Boteanu | .............. H04L 63/1425 |
| 2005/0207433 A1 * | 9/2005 | Ni | ............................ H04L 12/66 370/401 |
| 2009/0254655 A1 * | 10/2009 | Kidwell | ................... H04L 67/12 709/224 |
| 2013/0147901 A1 * | 6/2013 | Weiser | ................ H04L 65/1053 348/E7.083 |
| 2020/0267176 A1 * | 8/2020 | Asher | ................ H04L 63/0263 |
| 2022/0159022 A1 * | 5/2022 | Aghamirzaei | ..... G06Q 30/0248 |
| 2022/0329625 A1 * | 10/2022 | Ballew | ................ H04L 63/1483 |
| 2023/0007024 A1 * | 1/2023 | Maria Vega | ........ H04L 63/1441 |

(Continued)

*Primary Examiner* — Binh Kien Tieu

(57) ABSTRACT

A device may receive event data identifying events associated with user devices utilizing a video conferencing system, and may utilize the event data to train one or more fraud detection models. The device may receive, from a user device, user traffic including at least one of API traffic or media traffic, and may identify characteristics of the user traffic, such as activity related features, application-specific features, and dial-in number-specific features. The device may process at least one of the activity related features, the application-specific features, or the dial-in number-specific features, with the one or more fraud detection models, to determine whether the user traffic from the user device is anomalous or normal, and may block at least one of an IP address of the user device, a telephone number of the user device, or a meeting of the user device, based on determining that the user traffic is anomalous.

20 Claims, 9 Drawing Sheets

(56) References Cited

U.S. PATENT DOCUMENTS

2024/0121255 A1* 4/2024 Palanisamy ......... H04L 63/1425
2024/0223575 A1* 7/2024 Tomoda .............. H04L 63/1416

* cited by examiner

SYSTEMS AND METHODS FOR DETECTING AND PREVENTING FRAUD IN A VIDEO CONFERENCING SYSTEM

BACKGROUND

A user device (e.g., a mobile telephone, a tablet computer, a desktop computer and/or the like) may utilize a video conferencing application provided by a video conferencing system.

DETAILED DESCRIPTION OF EXAMPLE EMBODIMENTS

Figure 1A:
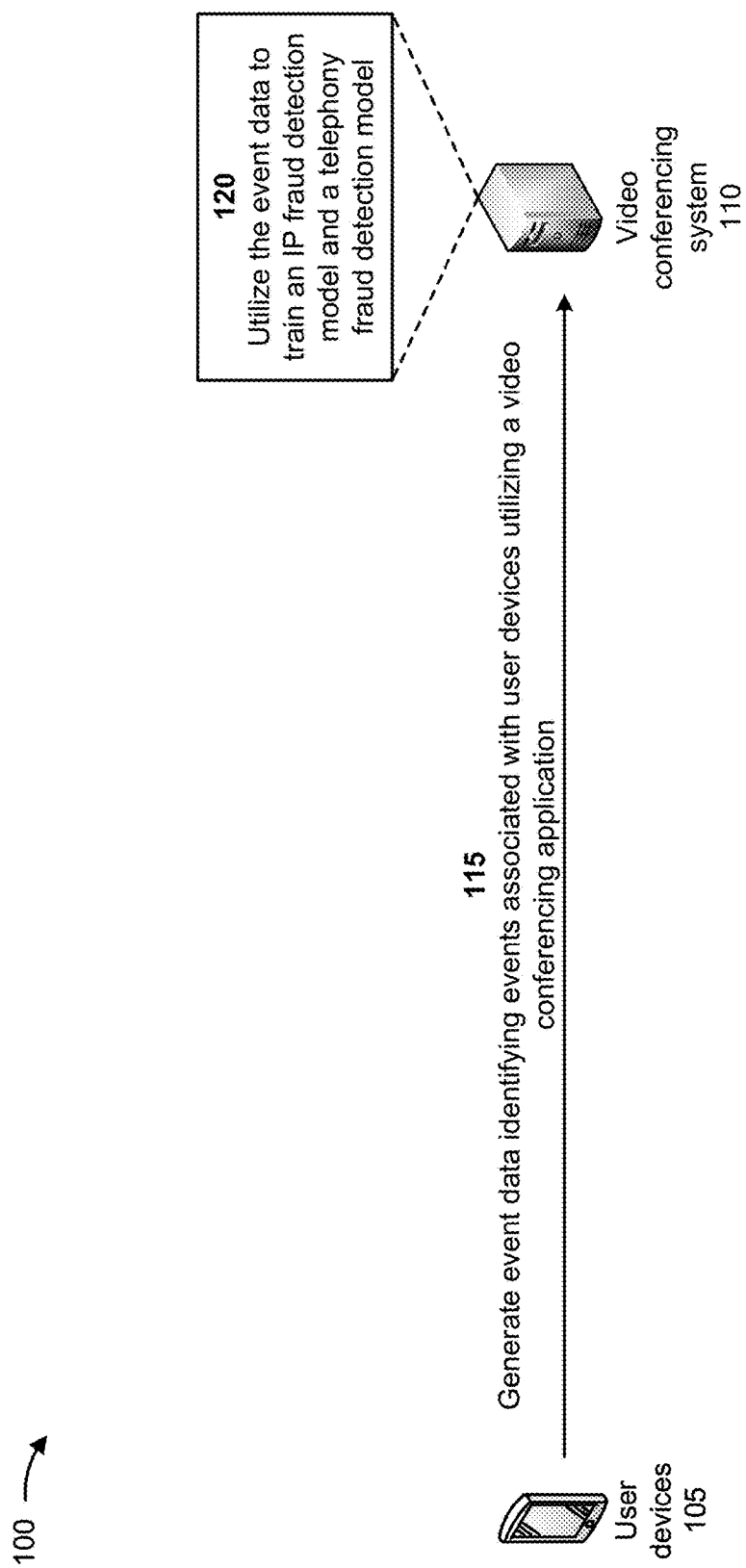
FIGS. 1A-1E are diagrams of an example associated with detecting and preventing fraud in a video conferencing system.

The following detailed description of example implementations refers to the accompanying drawings. The same reference numbers in different drawings may identify the same or similar elements.

A video conferencing system may provide a video conferencing application that enables two-way or multipoint reception and transmission of audio/video signals by user devices in various locations for real time communication. The user devices may include clients that communicate with the video conferencing application provided by the video conferencing system. Those clients can be called client applications. For example, users may access the video conferencing system through a client application that connects through an IP network (e.g., public Internet) to an IP interface of the video conferencing application, or through a voice calling application that connects through a telephony network (e.g., public telephone network) to a telephony interface of the video conferencing application. Users may then interact with their video conferencing system accounts through a user identifier and/or user credential, and may connect to meetings using meeting identifiers and/or passcodes.

Security is important for a video conferencing system, as sensitive information may be shared as part of a meeting, and video conferencing system interfaces are typically publicly exposed and susceptible to attacks. As one example, a bad actor may join a meeting using a compromised meeting identifier and/or passcode (e.g., as a "ghost") and may then have access to sensitive information shared as part of the meeting. As another example, a bad actor may join a meeting and cause large quantities of resources to be consumed (such as through high-cost voice telephony connections). Two common attack vectors on a video conferencing system to achieve fraud objectives are through the IP network interface and through the telephony network interface. In an IP attack, bad actors may utilize fraudulent IP network requests to the system, such as attempts to "enumerate" meeting identifiers and passcodes through repeated attempts, and then use determined valid credentials to exploit features of the video conferencing system. In a telephony network attack, bad actors may obtain dial-in numbers and join meetings from locations that exploit paid features of the video conferencing system, such as dial-out and premium/toll-free calling. As one example, a bad actor may cause the system to place calls to random phone numbers over long periods of time, which strains the resources of the system and may cause the video conferencing system to lose revenue for these paid features or incur costs from telephony toll charges.

Current mechanisms for providing a video conferencing application consume computing resources (e.g., processing resources, memory resources, communication resources, and/or the like), networking resources, and/or other resources associated with fraudulent use of the video conferencing system, enabling bad actors to access and utilize paid features of the video conferencing system for free, handling customer complaints associated with security breaches of the video conferencing system, degrading services provided by the video conferencing system due to bad actors, and/or the like.

Some implementations described herein provide a video conferencing system that detects and prevents fraud in the video conferencing system. For example, the video conferencing system may generate event data identifying events associated with a plurality of user devices utilizing the video conferencing system, and may utilize the event data to train one or more fraud/attack detection models, such as an IP fraud detection model and a telephony fraud detection model. The video conferencing system may receive user traffic from a user device, such as application programming interface (API) traffic and/or media traffic, and may identify operational characteristics of the user traffic such as activity related features, application-specific features, and dial-in number-specific features. The video conferencing system may process the characteristics with the one or more fraud detection models to determine whether the user traffic is anomalous or normal, and may take countermeasures to stop the fraudulent activity, such as blocking an IP address that is a source of the traffic is anomalous, blocking access to system resources for meetings that are associated with the anomalous traffic, or blocking a telephone number that is associated with a user device that engaging in the fraudulent activity. As one example, the video conferencing system may process the activity related features and the application-specific features, with the IP fraud detection model, to determine whether the user traffic is anomalous or normal, and may block an IP address of the user device based on determining that the traffic is anomalous. As another example, the video conferencing system may process the activity related features and the dial-in number-specific features, with the telephony fraud detection model, to determine whether the user traffic associated with a meeting is fraudulent or nonfraudulent, and may block resources, of the video conferencing system, for the meeting based on determining that the meeting is fraudulent.

In this way, the video conferencing system detects and prevents fraud in the video conferencing system. For example, the video conferencing system may provide fraud detection and fraud prevention for the video conferencing system in real time to effectively block fraudulent activities. The video conferencing system may utilize machine learning models to detect fraudulent activities associated with attacks such as IP fraud attacks and/or telephony fraud attacks. The video conferencing system may utilize machine learning models to prevent fraudulent activities associated with IP fraud attacks and/or telephony fraud attacks. Thus, the video conferencing system may conserve computing resources, networking resources, and/or other resources that would otherwise have been consumed by fraud attacks on the video conferencing system, enabling bad actors to access and utilize paid features of the video conferencing system for free, handling customer complaints associated with security breaches of the video conferencing system, degrading services provided by the video conferencing system due to bad actors, and/or the like.

FIGS. 1A-1E are diagrams of an example 100 associated with detecting and preventing fraud in a video conferencing system. As shown in FIG. 1A, the example 100 may include user devices 105 associated with a video conferencing system 110. The video conferencing system 110 may provide a video conferencing application that provides two-way or multipoint reception and transmission of audio and video signals by the user devices 105 in various locations for real time communication. In some implementations, the video conferencing system 110 may detect and prevent fraud in the video conferencing system 110. Further details of the user devices 105 and the video conferencing system 110 are provided elsewhere herein.

As shown in FIG. 1A, and by reference number 115, the video conferencing system 110 may generate or detect event data identifying events associated with the user devices 105 utilizing a video conferencing application. For example, the user devices 105 may utilize the video conferencing application provided by the video conferencing system 110, and the event data may be generated based on utilizing the video conferencing application. The event data may include data identifying successful and failed user login attempts of the video conferencing application by the user devices 105, successful and failed conference join attempts of the video conferencing application, via passcodes, by the user devices 105, successful and failed conference join attempts of the video conferencing application, via a telephony network, by the user devices 105, successful and failed user validity checks associated with the user devices 105 when utilizing the video conferencing application, successful and failed conference validity checks associated with the user devices 105 when utilizing the video conferencing application, and/or the like. In some implementations, the event data may include data identifying sources of the events, resources utilized by the events, event types of the events, and/or the like. In some implementations, the video conferencing system 110 may detect various application programming interface (API) events for a given IP address, such as a success or a failure, a resource accessed, a valid or an invalid resource accessed, a timestamp at which a resource was accessed, and/or the like. The video conferencing system 110 may map these events to various features, such as success or failure counts over time specific domain (e.g., successes or failures in a last quantity of hours, days, or weeks), a quantity of resources accessed by the IP address in a last quantity of hours, days, or weeks, a quantity of valid vs invalid resources accessed, a compatibility score of the IP address based on an enterprise identifier, a quantity of distinct resources accessed by the IP address over a time-specific domain, and/or the like.

In some implementations, the video conferencing system 110 (e.g., at an application layer) may generate the event data based on resource access attempts (e.g., both successful and failed) by the user devices 105, such as successful and failed user login attempts, successful and failed conference join attempts via passcodes, successful and failed conference join attempts of the video conferencing application via a telephony network, successful and failed user validity checks, successful and failed conference validity checks, and/or the like. The video conferencing system 110 may detect the event data in real time. In some implementations, the video conferencing system 110 may continuously detect the event data from the user devices 105, may periodically detect the event data from the user devices 105, may detect the event from the user devices 105 based on providing requests for the event data to the user devices 105, and/or the like.

As further shown in FIG. 1A, and by reference number 120, the video conferencing system 110 may utilize the event data to train an IP fraud detection model and a telephony fraud detection model. For example, the video conferencing system 110 may detect fraudulent behavior associated with video conferencing system 110, and may utilize machine learning models (e.g., the IP fraud detection model and the telephony fraud detection model) to differentiate between normal behavior and fraudulent behavior. In some implementations, the IP fraud detection model uses an isolation forest model. An isolation forest model can be used to solve unsupervised learning problems in the anomaly detection domain, and is useful in the typical case where the IP addresses of user devices sending traffic to the video conference application are unlabeled data. The isolation forest model is based on a tree structure, where a feature is picked at random and a split is made based on a gain value. This flow is followed until a complete tree is constructed and each data point is isolated. A sample may be classified as anomalous or normal based on a distance from a root to a node of the tree. A large quantity of such trees constitute a forest and final voting may be an aggregation of results of all individual trees.

In some implementations, the telephony fraud detection model may include a two-step semi-supervised model. In a first step, an unsupervised isolation forest model may be utilized to classify meetings as fraudulent or nonfraudulent. In a second step, a supervised random forest classifier model (e.g., trained on labeled dataset and updated over time based on feedback) may be utilized to classify the meetings as fraudulent or nonfraudulent based on input from the isolation forest model. The two-step model may be useful to limit a quantity of false positives output by the telephony fraud detection model.

In some implementations, the video conferencing system 110 may train the IP fraud detection model and the telephony fraud detection model with the event data. In some implementations, when utilizing the event data to train the IP fraud detection model and the telephony fraud detection model, the video conferencing system 110 may detect a fraudulent source or a compromised resource of the video conferencing system 110 based on training the IP fraud detection model and the telephony fraud detection model with the event data, and may assign a score to the fraudulent source or the compromised resource. The video conferencing system 110 may utilize the score to block the fraudulent source or the compromised resource; may provide the score to security personnel for review; may store the score, an identifier of the fraudulent source, or an identifier of the compromised resource in a repository (e.g., a database, a table, a list, and/or the like) associated with the video conferencing system 110; and/or the like.

Figure 1B:
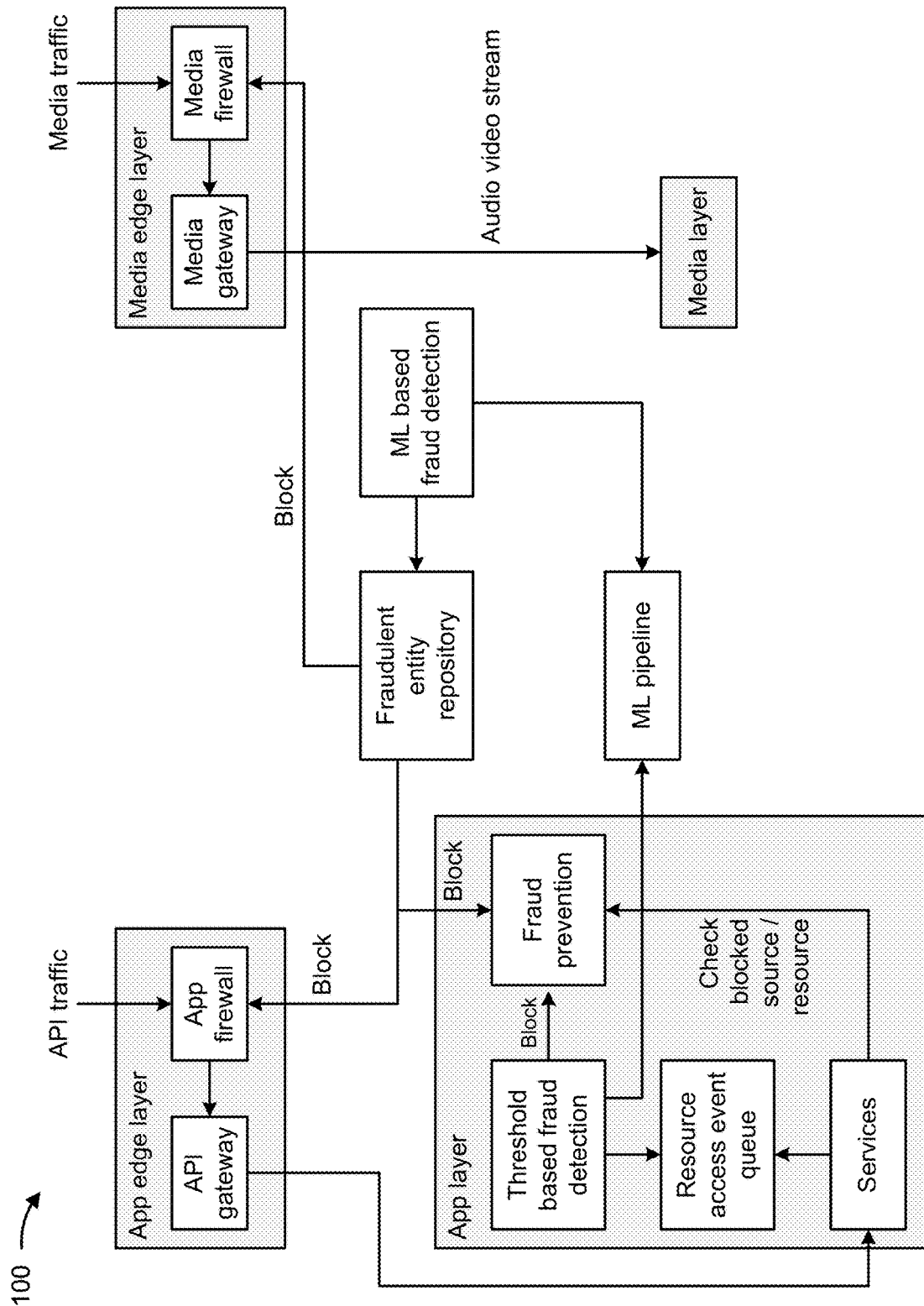

FIG. 1B depicts example fraud prevention layers of the video conferencing system 110. As shown, the video conferencing system 110 may include an application edge layer, an application layer, a media edge layer, a media layer, a fraudulent entity repository, a machine learning (ML) based fraud detection component, and a machine learning pipeline.

The video conferencing system 110 may communicate with the different fraud prevention layers, and may provide information identifying fraud affected sources and/or resources to the fraud prevention layers in real time. The fraud prevention layers may perform actual blocking of fraudulent activity. For example, notification of an IP address that has been found to be sourcing fraudulent traffic may be provided to the application edge layer, the application layer, and media edge layer to implement blocks. As another example, notification of a fraudulent conference identifier may be provided to the application layer to implement the block (the application edge layer and/or media edge layer may be omitted from where these layers are not involved in meeting resource management). The video conferencing system 110 may customize fraud prevention at the application layer for sources and resources specific to the video conferencing system 110. For example, the application layer may block IP addresses and other resources specific to the video conferencing system 110, such as conference identifiers, telephone numbers, and/or the like. Additionally, the video conferencing system 110 may track past history of a fraudulent entity (e.g., via an IP address), may include a capability to block the fraudulent entity for an incremental block duration, a capability to customize activity counter-related logic, and/or the like.

The application edge layer may include an application firewall that receives user traffic such as API traffic (e.g., API calls from user devices 105), allows nonfraudulent API traffic, and blocks fraudulent API traffic. The application edge layer may include an API gateway that receives filtered (e.g., unblocked) API traffic from the application firewall, and provides the filtered API traffic to a services component of the application layer.

The media edge layer may include a media firewall that receives user traffic such as media traffic (e.g., audio/video streams from user devices 105), allows nonfraudulent media traffic, and blocks fraudulent media traffic. The media edge layer may include a media gateway that receives filtered (e.g., unblocked) API traffic from the media firewall, and provides the filtered media traffic to the media layer for processing.

The application layer may include a threshold based fraud detection component that detects fraudulent API traffic based on thresholds and causes the fraudulent API traffic to be blocked. The application layer may include a resource access event queue that stores resource identifiers associated with fraudulent API traffic. The application layer may include a services component that receives the nonfraudulent API traffic from the API gateway of the application edge layer, and checks blocked sources and/or resources associated with the nonfraudulent API traffic. The application layer may include a fraud prevention component that receives information associated with fraudulent API traffic and prevents future fraud based on the information associated with the fraudulent API traffic.

The fraudulent entity repository may include a centralized component where all machine learning-detected sources and/or resources are stored. The fraudulent entity repository may store fraudulent or compromised entities in the video conferencing system 110. The machine learning based fraud detection component may include the IP fraud detection model and/or the telephony fraud detection model, as described elsewhere herein. The machine learning pipeline may receive the event data in real time, as described above, and may train the IP fraud detection model and/or the telephony fraud detection model based on the event data.

Figure 1C:
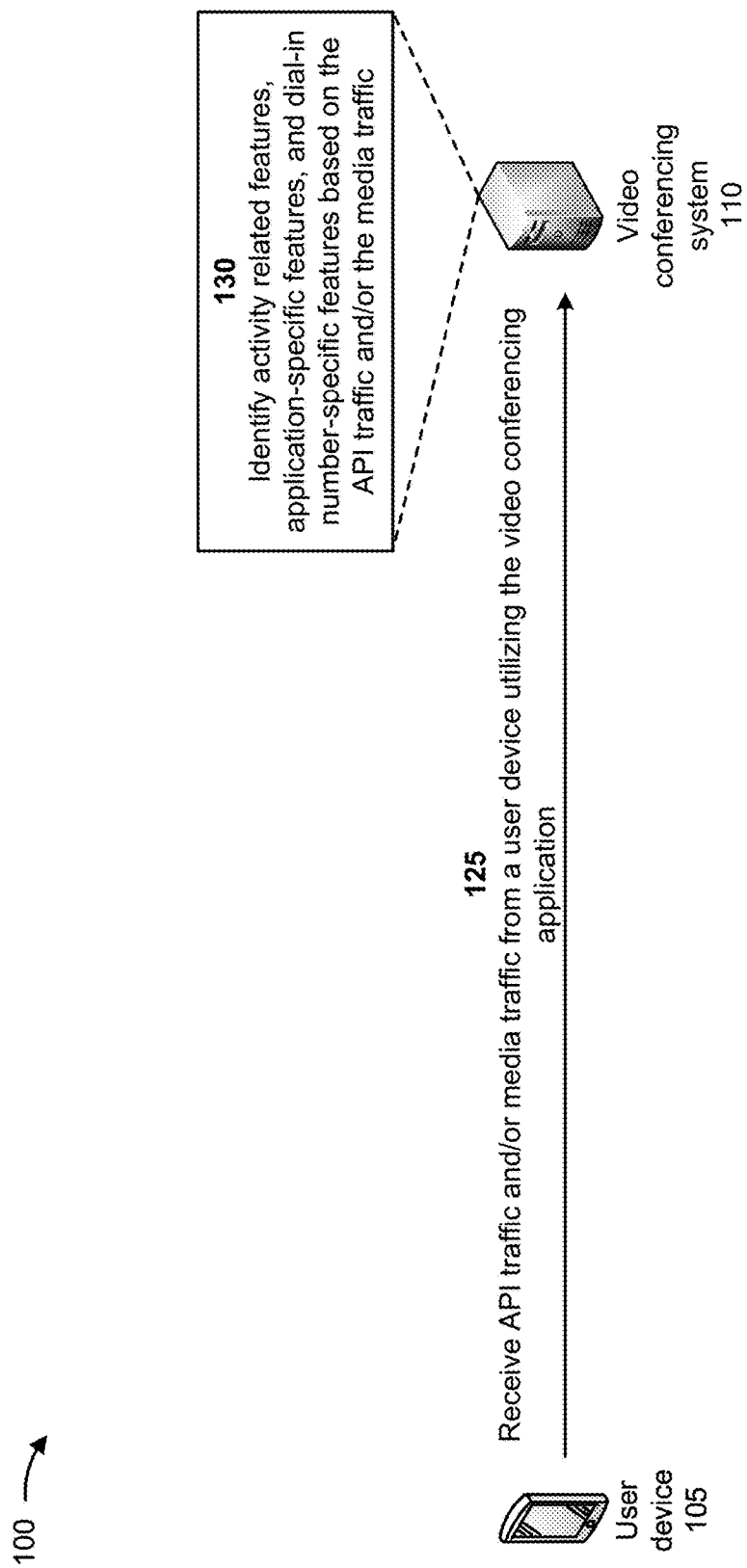

As shown in FIG. 1C, and by reference number 125, the video conferencing system 110 may receive user traffic such as API traffic and/or media traffic from a user device 105 utilizing the video conferencing application. For example, the user device 105 may generate API traffic and/or media traffic associated with the user device 105 utilizing a client application on the user device communicating with a network-based video conferencing application provided by the video conferencing system 110. The API traffic may include one or more API calls from the user device 105 (e.g., to invoke conferencing services, manage conference settings, etc.), and the media traffic may include an audio and/or video stream from the user device 105. The video conferencing system 110 may receive the API traffic and/or the media traffic from the user device 105.

As further shown in FIG. 1C, and by reference number 130, the video conferencing system 110 may identify operational characteristics based on the API traffic and/or the media traffic. For example, the API traffic and/or the media traffic may include various features—activity related features, application-specific features, and/or dial-in number-specific features—that may be processed by the IP fraud detection model and/or the telephony fraud detection model. The video conferencing system 110 may identify (e.g., detect, calculate) the various features in the API traffic and/or the media traffic, such as activity related features, application-specific features, dial-in number-specific features, and/or the like. The activity related features may include features associated with a pattern in which a user device associated with an IP address attempts to access the video conferencing system 110 over a time period, a dial out pattern for a meeting provided by the video conferencing system 110, a quantity of meetings joined over a time period, locations of the user devices 105 accessing the meetings, a dial out country for a meeting provided by the video conferencing system 110, a duration of a meeting provided by the video conferencing system 110, dial out duration for a meeting provided by the video conferencing system 110, and/or the like.

The application-specific features may include features associated with a quantity of resources of the video conferencing system 110 that are accessed by the user devices 105, unique resources of the video conferencing system 110 that are accessed by the user devices 105, a frequency of accessing a particular resource of the video conferencing system 110 by the user devices 105, a quantity of enterprise server devices of the video conferencing system 110 that are accessed by the user devices 105, a failure versus success ratio associated with access attempts of the video conferencing system 110, and/or the like. The dial-in number-specific features may include features associated with a quantity of meetings of the video conferencing system 110 that are joined, a toll free minutes versus toll minutes ratio associated with meetings of the video conferencing system 110, a quantity of enterprise server devices of the video conferencing system 110 that are accessed by the user devices 105, a quantity of unique meetings of the video conferencing system 110 that are joined by the user devices 105, a meeting join pattern over a time period for the video conferencing system 110, and/or the like.

Figure 1D:
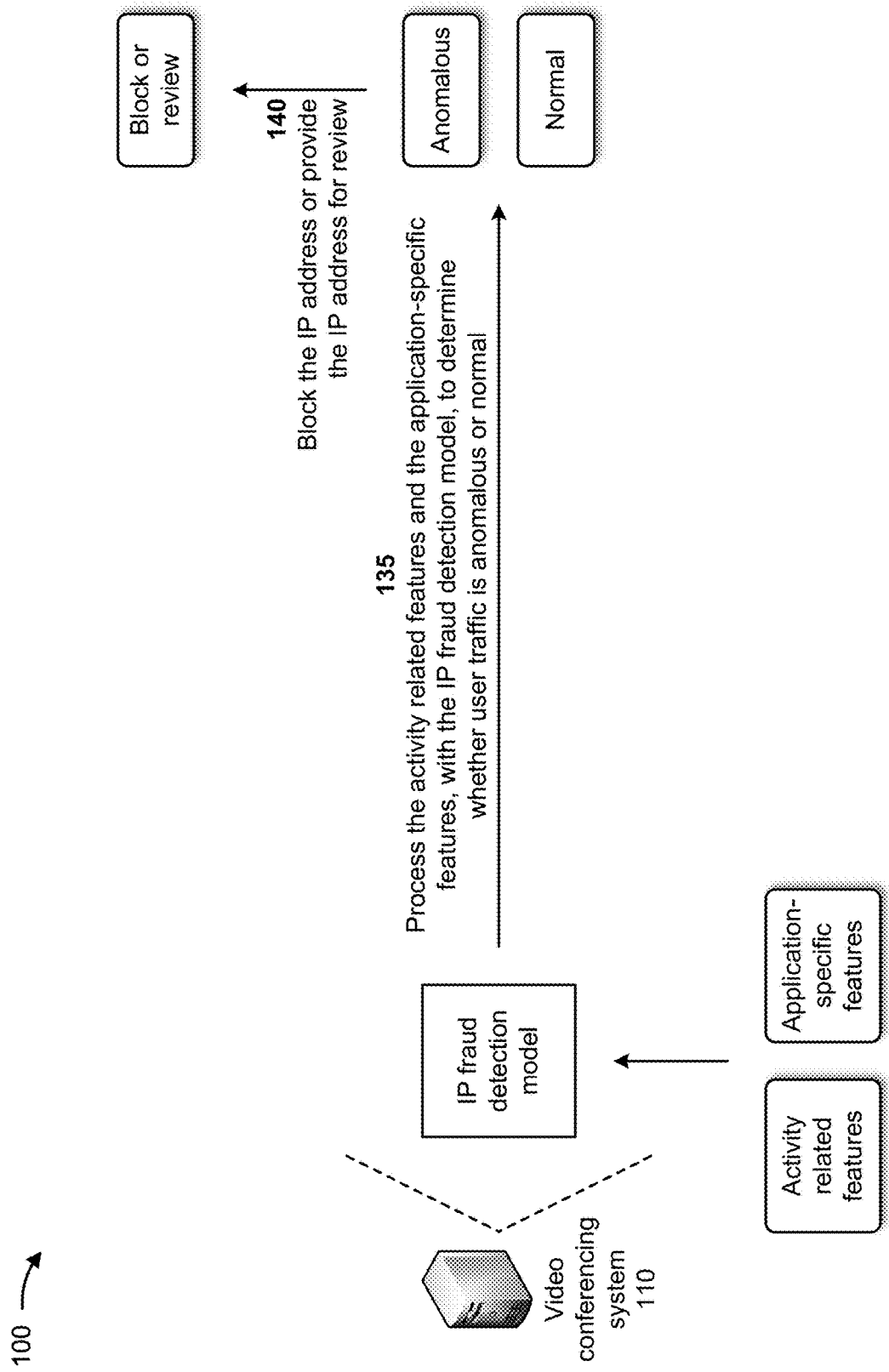

As shown in FIG. 1D, and by reference number 135, the video conferencing system 110 may process the activity related features and the application-specific features, with the IP fraud detection model, to determine whether an IP address is associated with activity that is anomalous or normal. For example, the IP fraud detection model may receive the activity related features and the application-specific features as input, and may process the input. In some implementations, the IP fraud detection model may aggregate and process the activity related features and the application-specific features with a particular frequency (e.g., every ten minutes, hourly, every two hours, and/or the like).

The IP fraud detection model may determine whether the activity associated with the IP address of a user device 105 is anomalous (e.g., fraudulent) or normal (e.g., not anomalous or nonfraudulent). In some implementations, the IP fraud detection model may determine that the IP address associated with the user device 105 is the source of anomalous activity and may determine that countermeasures should be taken against activity from the IP address, such as blocking traffic from the IP address or sending the IP address for review (e.g., automatically or by security personnel), as described below. In some implementations, the IP fraud detection model may determine that the activity associated with the user device 105 is normal and may enable the user device 105 to continue to utilize the video conferencing application.

As further shown in FIG. 1D, and by reference number 140, the video conferencing system 110 may block traffic from the IP address or may provide the IP address for review based on determining that the activity associated with the IP address is anomalous. For example, when the video conferencing system 110 (e.g., the IP fraud detection model) determines that the activity associated with the user device 105 is anomalous, the video conferencing system 110 (e.g., the IP fraud detection model) may invoke additional rules that block traffic from the IP address, send traffic from the IP address to an inspection system, send the IP address to security personnel for review, and/or the like. If the IP address is to be blocked, the video conferencing system 110 may invoke a backend API to block the IP address at the application firewall of the application edge layer and the service component of the application layer. When the activity from the IP address is detected as anomalous or fraudulent, the video conferencing system 110 may eventually block the IP address so that the user device associated with the IP address is unable to access the video conferencing system 110 in the future. For a security review of the IP address, the video conferencing system 110 may invoke an automated script that verifies the IP address against publicly available ownership and/or usage records and determines whether to block or ignore traffic from the IP address based on the verification.

Figure 1E:
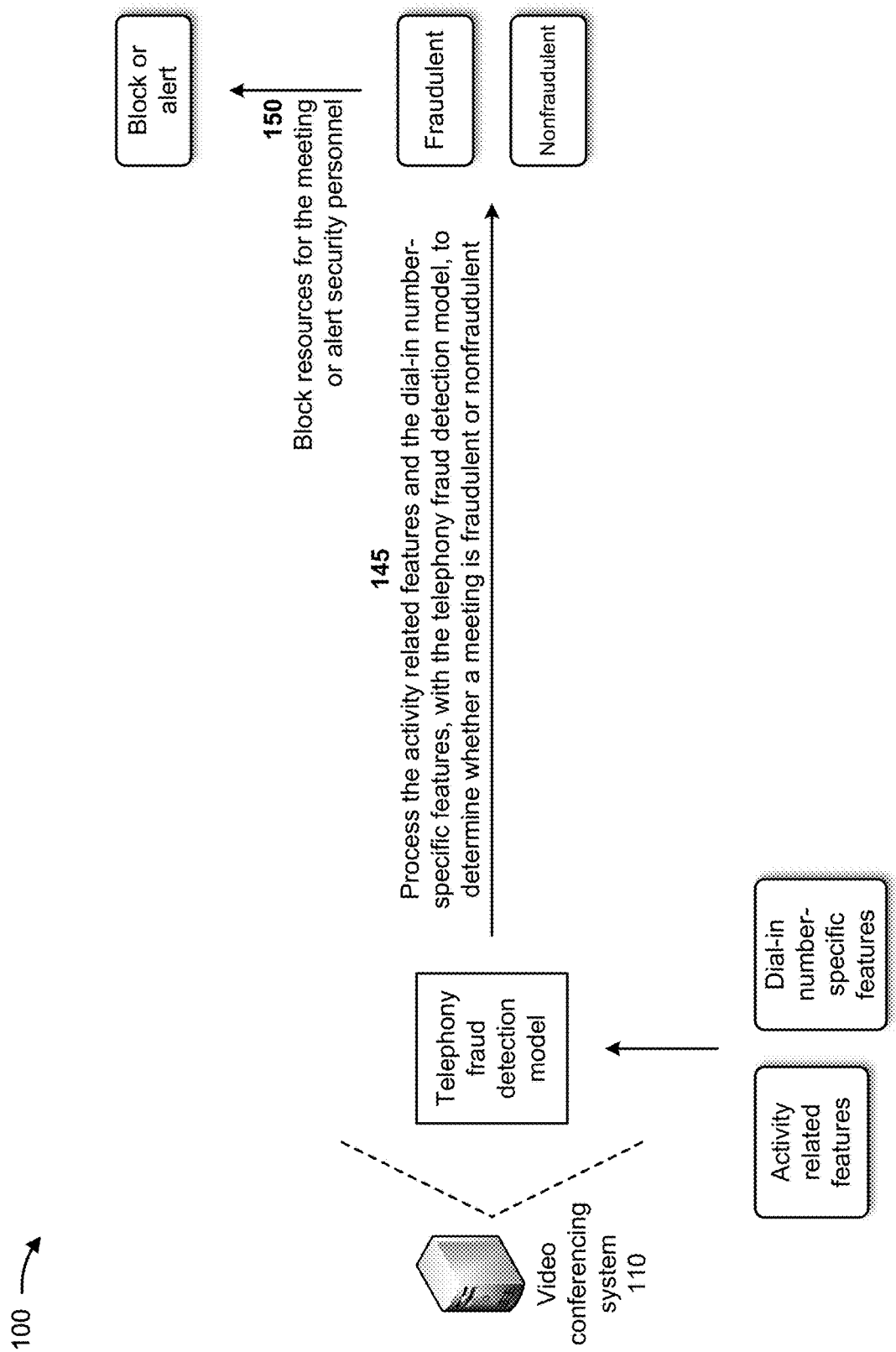

As shown in FIG. 1E, and by reference number 145, the video conferencing system 110 may process the activity related features and the dial-in number-specific features, with the telephony fraud detection model, to determine whether a meeting is fraudulent or nonfraudulent. For example, the telephony fraud detection model may receive the activity related features and the dial-in number-specific features as input, and may process the input. In some implementations, the telephony fraud detection model may aggregate and process the activity related features and the dial-in number-specific features with a particular frequency (e.g., every ten minutes, hourly, every two hours, and/or the like).

The telephony fraud detection model may determine whether a meeting associated with the user device 105 is fraudulent or nonfraudulent. In some implementations, the telephony fraud detection model may determine that the meeting associated with the user device 105 is fraudulent and may determine that resources for the meeting are to be blocked and/or that security personnel are to be alerted about the meeting, as described below. In some implementations, the telephony fraud detection model may determine that the meeting associated with the user device 105 is nonfraudulent and may enable the user device 105 to continue to utilize the meeting via the video conferencing application.

As further shown in FIG. 1E, and by reference number 150, the video conferencing system 110 may block resources for the meeting, block access to the video conferencing system by a telephone number of the user device, or may alert security personnel about the meeting based on determining that the meeting is fraudulent. For example, when the video conferencing system 110 (e.g., the telephony fraud detection model) determines that the meeting associated with the user device 105 is fraudulent, the video conferencing system 110 (e.g., the telephony fraud detection model) may invoke additional rules that directly block resources (e.g., of the video conferencing system 110) for the fraudulent meeting, block access to the system by a telephone number associated with the user device, alert security personnel about the fraudulent meeting, and/or the like. If the resources for the meeting are to be blocked, the video conferencing system 110 may automatically block the resources for the meeting. If security personnel are to be alerted, the video conferencing system may immediately notify the security personnel about the fraudulent meeting. The security personnel may cause the resources for the meeting to be blocked, may notify customers associated with the meeting, may block affected meeting identifiers associated with the fraudulent meeting (e.g., the dial-out fraud), and/or the like.

In some implementations, the telephony fraud detection model may classify meetings as fraudulent or non-fraudulent. For example, the video conferencing system 110 may classify PSTN numbers as fraudulent and add the PSTN numbers to a backend database to block any future calls. Meeting identifiers may be abused in both cases, and the video conferencing system 110 may block the meeting identifiers similar to PSTN numbers and activities associated with IP addresses.

In this way, the video conferencing system 110 detects and prevents fraud in the video conferencing system. For example, the video conferencing system 110 may provide fraud detection and fraud prevention for the video conferencing system 110 in real time to effectively block any fraudulent activities. The video conferencing system 110 may utilize machine learning models to detect fraudulent activities associated with IP fraud attacks and/or telephony fraud attacks. The video conferencing system 110 may utilize machine learning models to prevent fraudulent activities associated with IP fraud attacks and/or telephony fraud attacks. Thus, the video conferencing system 110 may conserve computing resources, networking resources, and/or other resources that would otherwise have been consumed by enabling bad actors to access and utilize paid features of the video conferencing system 110 for free, handling customer complaints associated with security breaches of the video conferencing system 110, degrading services provided by the video conferencing system 110 due to bad actors, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
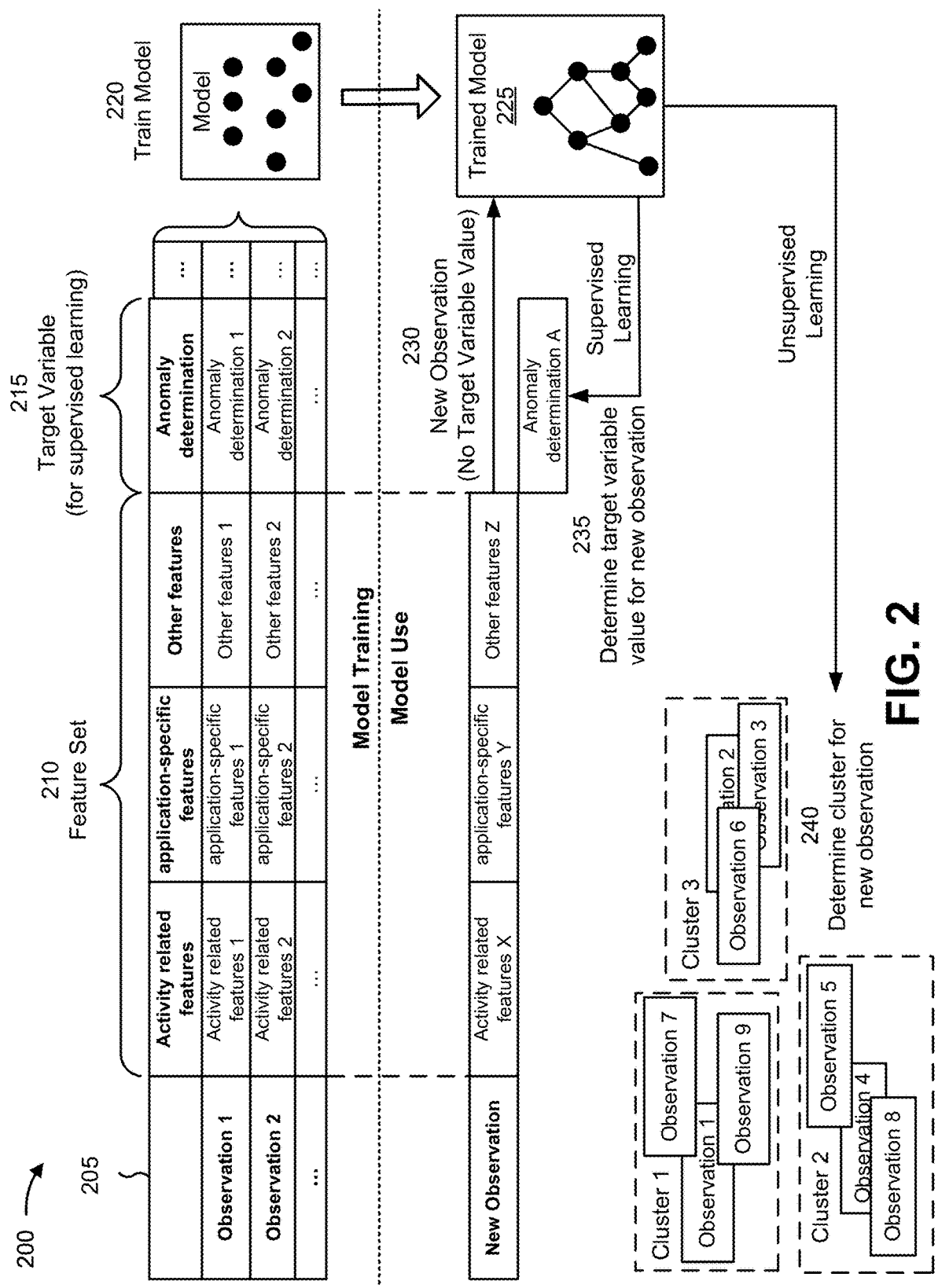
FIG. 2 is a diagram illustrating an example of training and using a machine learning model.

FIG. 2 is a diagram illustrating an example 200 of training and using a machine learning model for detecting and preventing fraud in the video conferencing system 110. The machine learning model training and usage described herein may be performed using a machine learning system. The machine learning system may include or may be included in a computing device, a server, a cloud computing environment, and/or the like, such as the video conferencing system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the video conferencing system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the video conferencing system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of activity related features, a second feature of application-specific features, a third feature of other features, and so on. As shown in FIG. 2, for a first observation, the first feature may have a value of "Activity Related Features 1", the second feature may have a value of "Application-Specific Features 1", the third feature may have a value of "Other Features 1", and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be anomaly determination and may include a value of "Anomaly Determination 1" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. As described above, in some implementations, the video conferencing system 110 may use an isolation forest model and an isolation forest model in combination with a random forest classifier model. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of activity related features X, a second feature of application-specific features Y, a third feature of other features Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of "Anomaly Determination A" for the target variable of the anomaly determination for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an activity related features cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an application-specific features cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to detect and prevent fraud in the video conferencing system 110. The machine learning system enables recognition and/or identification of tens, hundreds, thousands, or millions of features and/or feature values for tens, hundreds, thousands, or millions of observations, thereby increasing accuracy and consistency and reducing delay associated with detecting and preventing fraud in the video conferencing system 110 relative to requiring computing resources to be allocated for tens, hundreds, or thousands of operators to manually detect and prevent fraud in the video conferencing system 110.

As indicated above, FIG. 2 is provided as an example. Other examples may differ from what is described in connection with FIG. 2.

Figure 3:
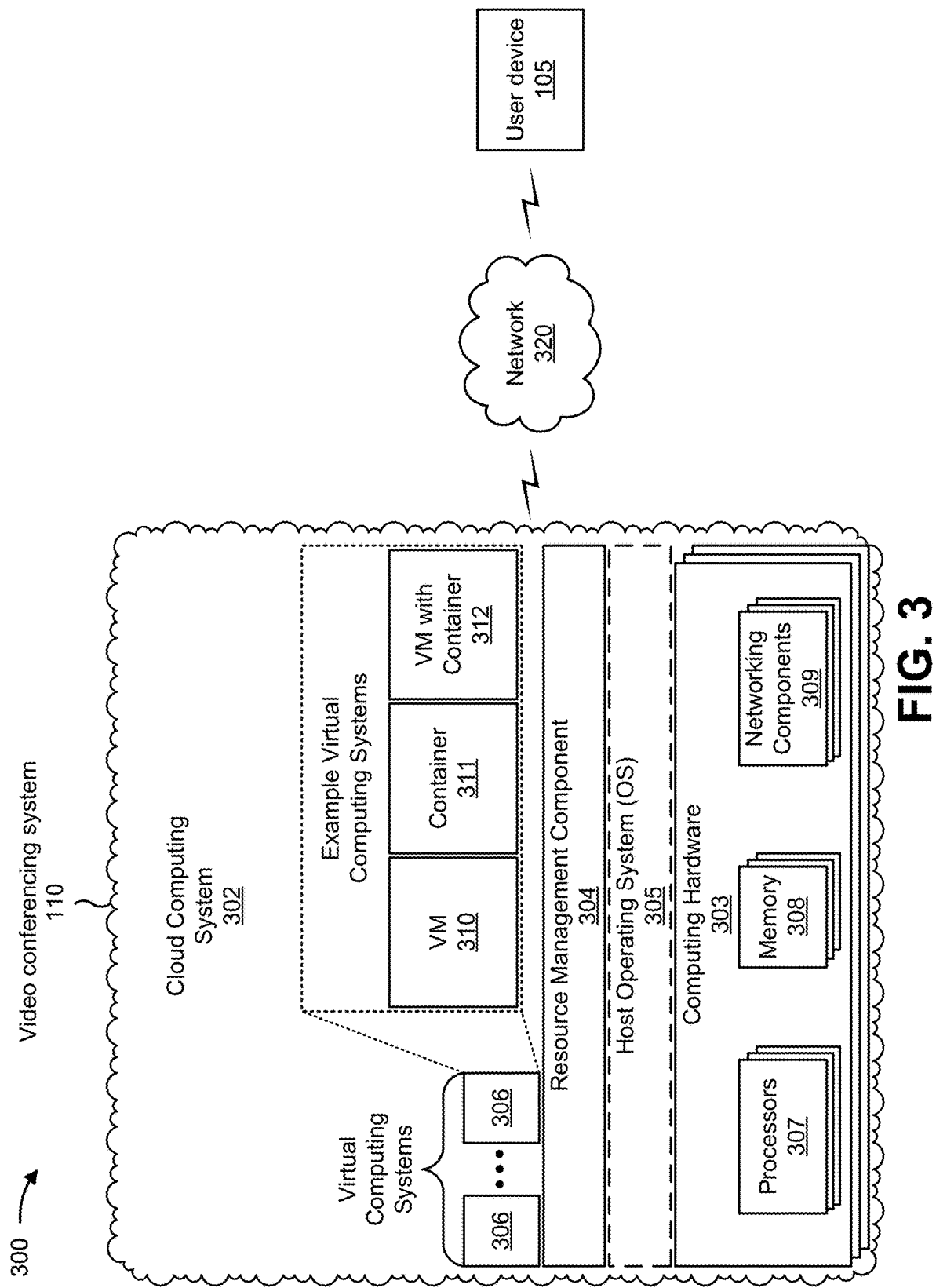
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a video conferencing system 110, which may include one or more elements of and/or may execute within a cloud computing system 302. The cloud computing system 302 may include one or more elements 303-312, as described in more detail below. As further shown in FIG. 3, the environment 300 may include the user device 105 and/or a network 320. Devices and/or elements of the environment 300 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment that includes a virtual machine 311 and a container 312, and/or the like. A virtual computing system 306 may execute one or more applications using a file system that includes binary files, software libraries, and/or other resources required to execute applications on a guest operating system (e.g., within the virtual computing system 306) or the host operating system 305.

Although the video conferencing system 110 may include one or more elements 303-312 of the cloud computing system 302, may execute within the cloud computing system 302, and/or may be hosted within the cloud computing system 302, in some implementations, the video conferencing system 110 may not be cloud-based (e.g., may be implemented outside of a cloud computing system) or may be partially cloud-based. For example, the video conferencing system 110 may include one or more devices that are not part of the cloud computing system 302, such as a device 400 of FIG. 4, which may include a standalone server or another type of computing device. The video conferencing system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
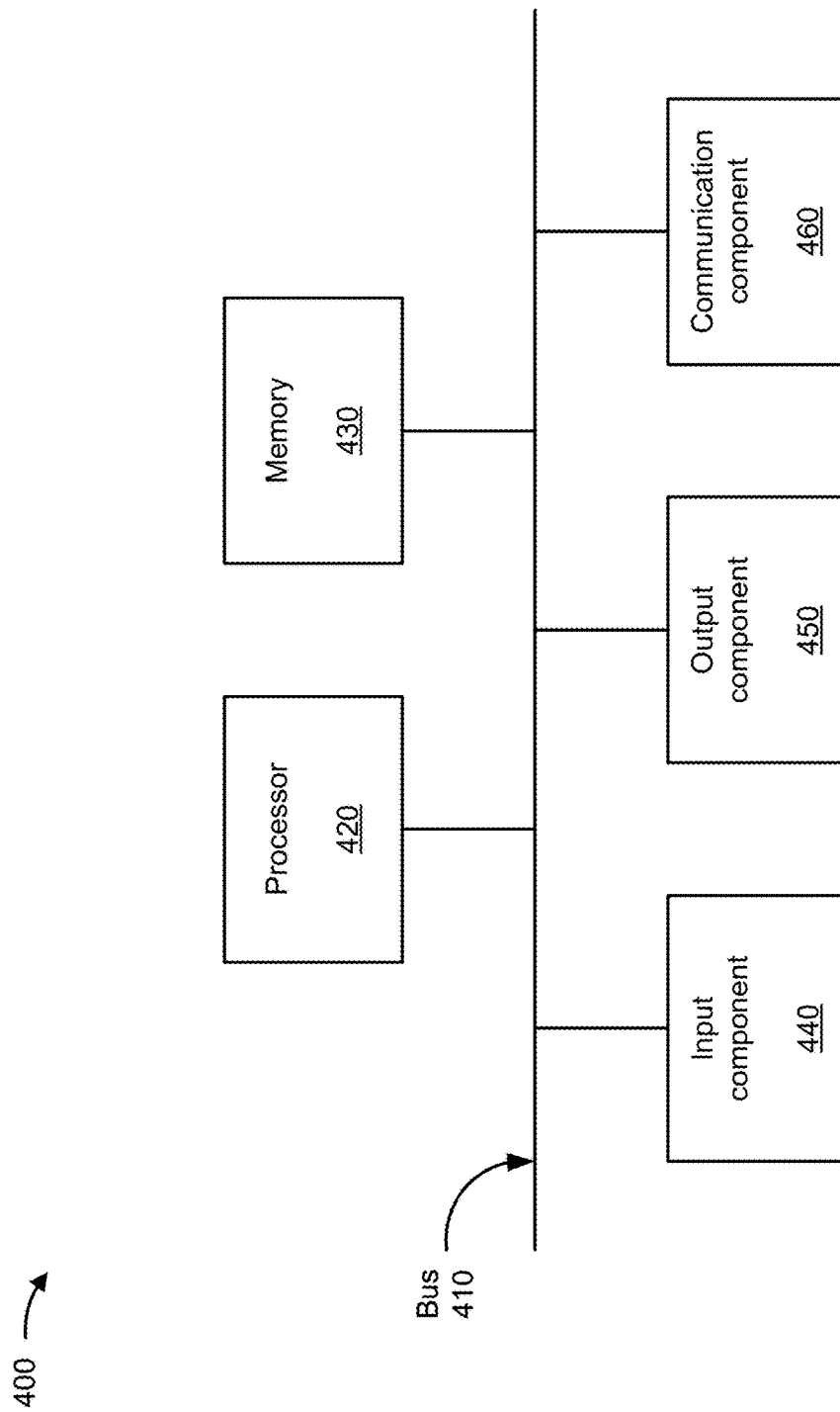
FIG. 4 is a diagram of example components of one or more devices of FIG. 3.

FIG. 4 is a diagram of example components of a device 400, which may correspond to the user device 105 and/or the video conferencing system 110. In some implementations, the user device 105 and/or the video conferencing system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
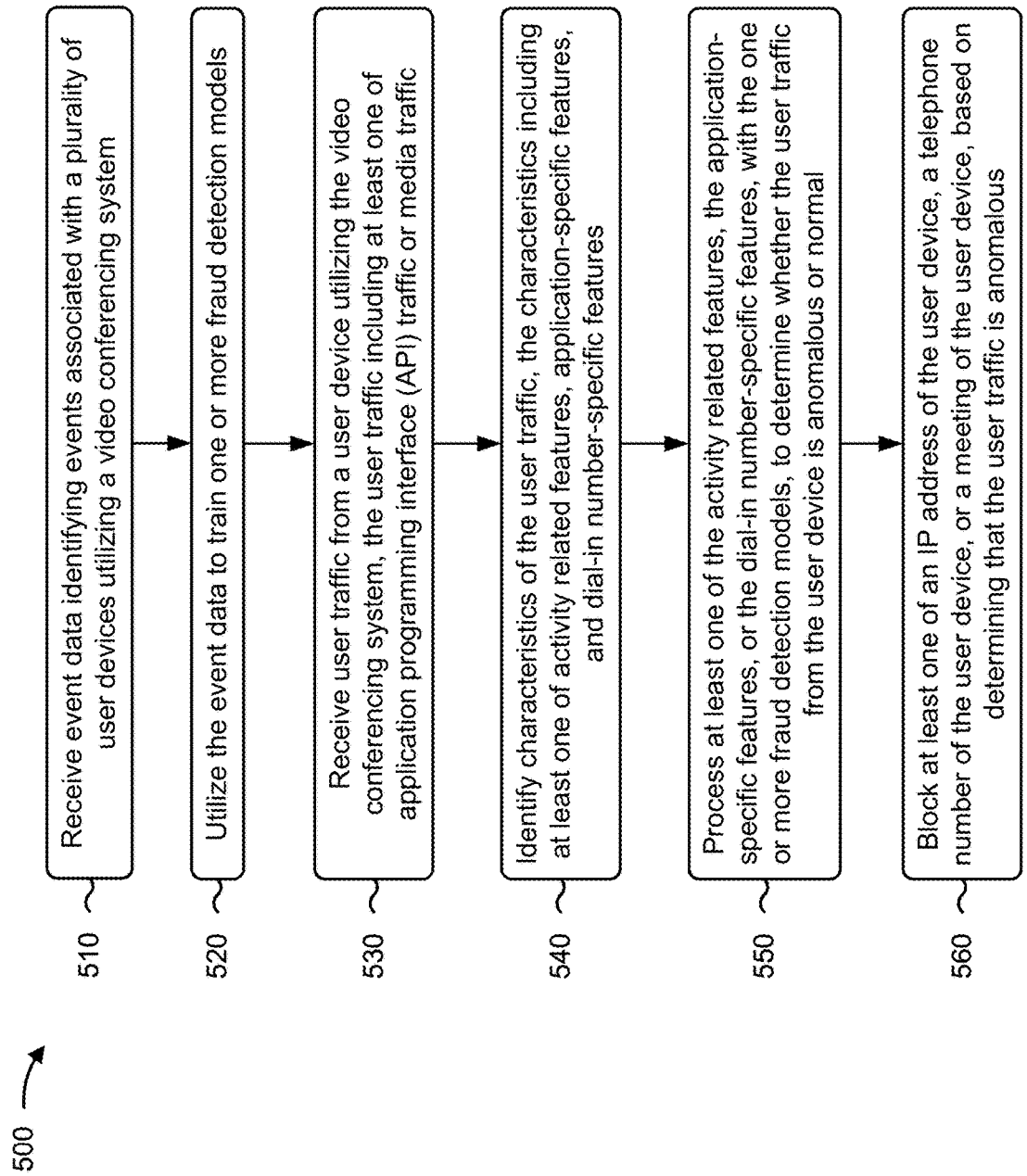
FIG. 5 is a flowchart of an example process for detecting and preventing fraud in a video conferencing system.

FIG. 5 is a flowchart of an example process 500 for detecting and preventing fraud in a video conferencing system. In some implementations, one or more process blocks of FIG. 5 may be performed by a video conferencing system (e.g., the video conferencing system 110). In some implementations, one or more process blocks of FIG. 5 may be performed by another device or a group of devices separate from or including the network device, such as a user device (e.g., the user device 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving event data identifying events associated with a plurality of user devices utilizing a video conferencing system (block 510). For example, the device may receive event data identifying events associated with a plurality of user devices utilizing a video conferencing system, as described above. In some implementations, the events associated with the plurality of user devices include one or more of successful and failed user login attempts by the plurality of user devices, successful and failed conference join attempts via passcodes by the plurality of user devices, successful and failed conference join attempts via a telephony network by the plurality of user devices, successful and failed user validity checks associated with the plurality of user devices, or successful and failed conference validity checks associated with the plurality of user devices.

As further shown in FIG. 5, process 500 may include utilizing the event data to train one or more fraud detection models (block 520). For example, the device may utilize the event data to train one or more fraud detection models, as described above.

As further shown in FIG. 5, process 500 may include receiving user traffic from a user device utilizing the video conferencing system, the user traffic including at least one of application programming interface (API) traffic or media traffic (block 530). For example, the device may receive user traffic from a user device utilizing the video conferencing system, the user traffic including at least one of application programming interface (API) traffic or media traffic, as described above.

As further shown in FIG. 5, process 500 may include identifying characteristics of the user traffic, the characteristics including at least one of activity related features, application-specific features, and dial-in number-specific features (block 540). For example, the device may identify characteristics of the user traffic, the characteristics including at least one of activity related features, application-specific features, and dial-in number-specific features, as described above.

As further shown in FIG. 5, process 500 may include processing at least one of the activity related features, the application-specific features, or the dial-in number-specific features, with the one or more fraud detection models, to determine whether the user traffic from the user device is anomalous or normal (block 550). For example, the device may process at least one of the activity related features, the application-specific features, or the dial-in number-specific features, with the one or more fraud detection models, to determine whether the user traffic from the user device is anomalous or normal, as described above. In some implementations, the one or more fraud detection models include an IP fraud detection model, and the IP fraud detection model includes an isolation forest model.

As further shown in FIG. 5, process 500 may include blocking at least one of an IP address of the user device, a telephone number of the user device, or a meeting of the user device, based on determining that the user traffic is anomalous (block 560). For example, the device may block at least one of an IP address of the user device, a telephone number of the user device, or a meeting of the user device, based on determining that the user traffic is anomalous, as described above.

In some implementations, process 500 includes providing the IP address for review based on determining that the user traffic is anomalous. In some implementations, the one of more fraud detection models include a telephony fraud detection model, and process 500 includes processing the activity related features and the dial-in number-specific features, with the telephony fraud detection model, to determine whether the meeting, associated with the user device, is fraudulent or nonfraudulent, and blocking resources, of the device, for the meeting based on determining that the meeting is fraudulent.

In some implementations, process 500 includes one or more of alerting security personnel about the meeting based on determining that the meeting is fraudulent, or storing an identifier of the meeting in a repository associated with the device. In some implementations, processing the activity related features and the dial-in number-specific features, with the telephony fraud detection model, to determine whether the meeting is fraudulent or nonfraudulent comprises processing the activity related features and the dial-in number-specific features, with an isolation forest model, to generate a determination of whether the meeting is fraudulent or nonfraudulent, and processing the activity related features, the dial-in number-specific features, and the determination, with a random forest classifier model, to determine whether the meeting is fraudulent or nonfraudulent.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, event data identifying events associated with a plurality of user devices utilizing a video conferencing system;
   utilizing, by the device, the event data to train one or more fraud detection models;
   receiving, by the device, user traffic from a user device utilizing the video conferencing system, the user traffic including at least one of application programming interface (API) traffic or media traffic;

identifying, by the device, characteristics of the user traffic, the characteristics including at least one of activity related features, application-specific features, and dial-in number-specific features;

processing, by the device, at least one of the activity related features, the application-specific features, or the dial-in number-specific features, with the one or more fraud detection models, to determine whether the user traffic from the user device is anomalous or normal;

blocking, by the device, the user device from accessing the video conferencing system, based on determining that the user traffic is anomalous; and invoking an automated script that verifies an internet protocol (IP) address of the user device against publicly available records and determines whether to block traffic from the IP address of the user device based on the verification.

2. The method of claim 1, further comprising:

providing the IP address of the user device for review based on determining that the user traffic is anomalous.

3. The method of claim 1, wherein the one of more fraud detection models include a telephony fraud detection model, and the method further comprises:

processing the activity related features and the dial-in number-specific features, with the telephony fraud detection model, to determine whether a meeting, associated with the user device, is fraudulent or nonfraudulent; and blocking resources, of the device, for the meeting based on determining that the meeting is fraudulent.

4. The method of claim 3, further comprising one or more of:

alerting security personnel about the meeting based on determining that the meeting is fraudulent; or storing an identifier of the meeting in a repository associated with the device.

5. The method of claim 3, wherein processing the activity related features and the dial-in number-specific features, with the telephony fraud detection model, to determine whether the meeting is fraudulent or nonfraudulent comprises:

processing the activity related features and the dial-in number-specific features, with an isolation forest model, to generate a determination of whether the meeting is fraudulent or nonfraudulent; and processing the activity related features, the dial-in number-specific features, and the determination, with a random forest classifier model, to determine whether the meeting is fraudulent or nonfraudulent.

6. The method of claim 1, wherein the one or more fraud detection models include an IP fraud detection model, and the IP fraud detection model includes an isolation forest model.

7. The method of claim 1, wherein the events associated with the plurality of user devices include one or more of:

successful and failed user login attempts by the plurality of user devices, successful and failed conference join attempts via passcodes by the plurality of user devices, successful and failed conference join attempts via a telephony network by the plurality of user devices, successful and failed user validity checks associated with the plurality of user devices, or successful and failed conference validity checks associated with the plurality of user devices.

8. A device, comprising:

one or more processors configured to:

receive event data identifying events associated with a plurality of user devices utilizing a video conferencing system;

utilize the event data to train one or more fraud detection models;

receive user traffic from a user device utilizing the video conferencing system, the user traffic including at least one of application programming interface (API) traffic or media traffic;

identify characteristics of the user traffic, the characteristics including at least one of activity related features, application-specific features, and dial-in number-specific features;

process at least one of the activity related features, the application-specific features, or the dial-in number-specific features, with the one or more fraud detection models, to determine whether the user traffic from the user device is anomalous or normal;

block the user device from accessing the video conferencing system, based on determining that the user traffic is anomalous; and invoke an automated script that verifies an internet protocol (IP) address of the user device against publicly available records and determines whether to block traffic from the IP address of the user device based on the verification.

9. The device of claim 8, wherein the one or more processors are further configured to:

provide the IP address of the user device for review based on determining that the user traffic is anomalous.

10. The device of claim 8, wherein the one of more fraud detection models include a telephony fraud detection model, and the one or more processors are further configured to:

process the activity related features and the dial-in number-specific features, with the telephony fraud detection model, to determine whether a meeting, associated with the user device, is fraudulent or nonfraudulent; and block resources, of the device, for the meeting based on determining that the meeting is fraudulent.

11. The device of claim 10, wherein the one or more processors are further configured to one or more of:

alert security personnel about the meeting based on determining that the meeting is fraudulent; or store an identifier of the meeting in a repository associated with the device.

12. The device of claim 10, wherein the one or more processors, to process the activity related features and the dial-in number-specific features, with the telephony fraud detection model, to determine whether the meeting is fraudulent or nonfraudulent, are configured to:

process the activity related features and the dial-in number-specific features, with an isolation forest model, to generate a determination of whether the meeting is fraudulent or nonfraudulent; and process the activity related features, the dial-in number-specific features, and the determination, with a random forest classifier model, to determine whether the meeting is fraudulent or nonfraudulent.

13. The device of claim 8, wherein the one or more fraud detection models include an IP fraud detection model, and the IP fraud detection model includes an isolation forest model.

14. The device of claim 8, wherein the events associated with the plurality of user devices include one or more of:

successful and failed user login attempts by the plurality of user devices, successful and failed conference join attempts via passcodes by the plurality of user devices, successful and failed conference join attempts via a telephony network by the plurality of user devices, successful and failed user validity checks associated with the plurality of user devices, or successful and failed conference validity checks associated with the plurality of user devices.

15. A non-transitory computer-readable medium storing a set of instructions, the set of instructions comprising:
one or more instructions that, when executed by one or more processors of a device, cause the device to:
receive event data identifying events associated with a plurality of user devices utilizing a video conferencing system;
utilize the event data to train one or more fraud detection models;
receive user traffic from a user device utilizing the video conferencing system, the user traffic including at least one of application programming interface (API) traffic or media traffic;
identify characteristics of the user traffic, the characteristics including at least one of activity related features, application-specific features, and dial-in number-specific features;
process at least one of the activity related features, the application-specific features, or the dial-in number-specific features, with the one or more fraud detection models, to determine whether the user traffic from the user device is anomalous or normal;
block the user device from accessing the video conferencing system, based on determining that the user traffic is anomalous; and
invoke an automated script that verifies an internet protocol (IP) address of the user device against publicly available records and determines whether to block traffic from the IP address of the user device based on the verification.

16. The non-transitory computer-readable medium of claim 15, wherein the one or more instructions further cause the device to:
provide the IP address of the user device for review based on determining that the user traffic is anomalous.

17. The non-transitory computer-readable medium of claim 15, wherein the one or more instructions further cause the device to:
process the activity related features and the dial-in number-specific features, with a telephony fraud detection model, to determine whether a meeting, associated with the user device, is fraudulent or nonfraudulent; and
block resources, of the device, for the meeting based on determining that the meeting is fraudulent.

18. The non-transitory computer-readable medium of claim 17, wherein the one or more instructions further cause the device to one or more of:
alert security personnel about the meeting based on determining that the meeting is fraudulent; or
store an identifier of the meeting in a repository associated with the device.

19. The non-transitory computer-readable medium of claim 17, wherein the one or more instructions, that cause the device to process the activity related features and the dial-in number-specific features, with the telephony fraud detection model, to determine whether the meeting is fraudulent or nonfraudulent, cause the device to:
process the activity related features and the dial-in number-specific features, with an isolation forest model, to generate a determination of whether the meeting is fraudulent or nonfraudulent; and
process the activity related features, the dial-in number-specific features, and the determination, with a random forest classifier model, to determine whether the meeting is fraudulent or nonfraudulent.

20. The non-transitory computer-readable medium of claim 15, wherein the one or more fraud detection models include an IP fraud detection model, and the IP fraud detection model includes an isolation forest model.

* * * * *